(12) United States Patent
Morita

(10) Patent No.: US 7,015,959 B1
(45) Date of Patent: Mar. 21, 2006

(54) IMAGE PICKUP APPARATUS FOR PICKING UP AND RECORDING STILL OR MOVING IMAGES AND A METHOD FOR CONTROLLING THE SAME

(75) Inventor: Masahiko Morita, Akiruno (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/531,283

(22) Filed: Mar. 20, 2000

(30) Foreign Application Priority Data

Mar. 23, 1999 (JP) ................... 11-077369

(51) Int. Cl.
*H04N 5/76* (2006.01)

(52) U.S. Cl. ............... 348/231.9; 348/231.8; 348/222.1; 348/231.1

(58) Field of Classification Search ............ 348/231.9, 348/231.3, 333.01, 333.04, 333.13, 373, 348/131.99, 231.6, 220.1, 231.99, 207.1, 348/231.2, 231.4, 207.2, 231.1, 211.3, 231.7, 348/231.8
See application file for complete search history.

(56) References Cited

U.S. PATENT DOCUMENTS

| | | | | |
|---|---|---|---|---|
| 4,320,414 A | * | 3/1982 | Miyaji et al. ............... 348/263 |
| 4,733,265 A | * | 3/1988 | Haraguchi et al. .......... 396/277 |
| 4,853,733 A | * | 8/1989 | Watanabe et al. ........... 396/300 |
| 5,150,147 A | * | 9/1992 | Kobayshi et al. ............. 396/76 |
| 5,198,850 A | * | 3/1993 | Saegusa ...................... 396/236 |
| 5,481,303 A | * | 1/1996 | Uehara .................... 348/231.1 |
| 5,635,984 A | * | 6/1997 | Lee ....................... 348/333.05 |
| 5,717,496 A | * | 2/1998 | Satoh et al. ................ 358/402 |
| 5,852,467 A | * | 12/1998 | Ogino ..................... 348/231.1 |
| 5,943,517 A | * | 8/1999 | Sato ........................... 396/429 |
| 6,226,449 B1 | * | 5/2001 | Inoue et al. ................ 386/120 |
| 6,249,651 B1 | * | 6/2001 | Maruyama ................. 396/303 |
| 6,429,896 B1 | * | 8/2002 | Aruga et al. ........... 348/231.99 |
| 6,441,854 B1 | * | 8/2002 | Fellegara et al. ....... 348/333.13 |
| 6,674,538 B1 | * | 1/2004 | Takahashi .................. 358/1.15 |
| 6,753,921 B1 | * | 6/2004 | Shimizu .................... 348/372 |
| 6,870,566 B1 | * | 3/2005 | Koide et al. ............... 348/296 |

\* cited by examiner

*Primary Examiner*—Ngoc-Yen Vu
*Assistant Examiner*—Nelson D. Hernandez
(74) *Attorney, Agent, or Firm*—Cowan, Liebowitz & Latman, P.C.

(57) ABSTRACT

When an image pickup apparatus is changed over to a mode different from a photographing mode, such as a power-off mode or a reproducing mode, priority is given to writing a temporarily-recorded image in a recording medium, so that it is possible to surely preserve the photographed image. Moreover, it is possible for the user to confirm or enjoy the photographed image, by virtue of functions which are different from the photographing operation.

3 Claims, 10 Drawing Sheets

IMAGE PICKUP APPARATUS FOR PICKING UP AND RECORDING STILL OR MOVING IMAGES AND A METHOD FOR CONTROLLING THE SAME

BACKGROUND OF THE INVENTION

1. Field of the Invention

The present invention relates to an image pickup apparatus for picking up and recording a still image or a moving image, and also relates to a method for controlling the image pickup and recording operation of the image pickup apparatus, and a storage medium which stores therein a program for executing a process for controlling the image pickup and recording operation of the image pickup apparatus.

2. Description of Related Art

Conventionally, as an image pickup apparatus, there has been put in the market an electronic camera which utilizes as a recording medium a memory card having solid memory elements and which is capable of picking up and recording a still image or a moving image. However, such a kind of an electronic camera has recently encountered a problem that may be concluded as follows. Namely, with digitization of video signals and with enlargement of the image size, an interval of image pickup and image recording will be undesirably increased. If this problem is not solved, there will always be a possibility that a good shutter opportunity can not be caught.

In order to solve the above problem, in Japanese Laid-Open Patent Application No. Hei 6-86203, there is disclosed an electronic camera in which a photographed image is first temporarily stored and, if the next photographing command is received while the temporarily stored image is being recorded in a recording medium, such a recording process may be paused so as to start the photographing operation again.

However, as far as the user is concerned, it is not important to know how photographing, storing and recording operations are effected within the electronic camera. Instead, it is important to know how a photographing operation can be performed smoothly. Thus, it is usual for the user to think that an image recognized to have been photographed has been already recorded in a recording medium.

Nevertheless, up till now there has not been such technique that can be used to prevent, under the condition that a temporarily stored image is existing in a volatile buffer memory, the disappearance of image data possibly caused by a drop in an electric power source due to a mode change from a photographing mode to a power-off mode or caused by the detachment of a battery, or the disappearance of image data possibly caused by a failure in hardware due to the changeover to a mode other than the photographing mode, such as a reproduction mode.

BRIEF SUMMARY OF THE INVENTION

The present invention has been accomplished in view of the above problem, and an object of the present invention is to provide an image pickup apparatus which is capable of surely storing image data under any kind of conditions.

To attain the above object, in accordance with an aspect of the present invention, there is provided an image pickup apparatus, comprising image pickup means for picking up image data of an object, a volatile recording medium for temporarily recording therein the image data picked up by the image pickup means, a nonvolatile recording medium for recording therein the image data recorded in the volatile recording medium, change-over means for changing over an operation processing mode of the image pickup apparatus, and control means for, if the processing operation mode has been changed over by the change-over means, effecting a processing operation of a mode to which the operation processing mode has been changed over by the change-over means, after recording in the nonvolatile recording medium the image data recorded in the volatile recording medium.

In accordance with another aspect of the present invention, there is provided a method for controlling an image pickup apparatus, the method comprising the steps of picking up image data of an object, temporarily recording the picked-up image data in a volatile recording medium, recording in a nonvolatile recording medium the image data recorded in the volatile recording medium, and, if a processing operation mode of the image pickup apparatus has been changed over, effecting a processing operation of a mode to which the operation processing mode has been changed over, after recording in the nonvolatile recording medium the image data recorded in the volatile recording medium.

In accordance with a further aspect of the present invention, there is provided a storage medium which stores therein a program for executing a process for controlling an image pickup apparatus, the process comprising picking up image data of an object, temporarily recording the picked-up image data in a volatile recording medium, recording in a nonvolatile recording medium the image data recorded in the volatile recording medium, and, if a processing operation mode of the image pickup apparatus has been changed over, effecting a processing operation of a mode to which the operation processing mode has been changed over, after recording in the nonvolatile recording medium the image data recorded in the volatile recording medium.

The above and further objects and features of the present invention will become apparent from the following detailed description of a preferred embodiment thereof taken in conjunction with the accompanying drawings.

DETAILED DESCRIPTION OF THE INVENTION

Hereinafter, a preferred embodiment of the present invention will be described in detail with reference to the drawings.

Figure 1:
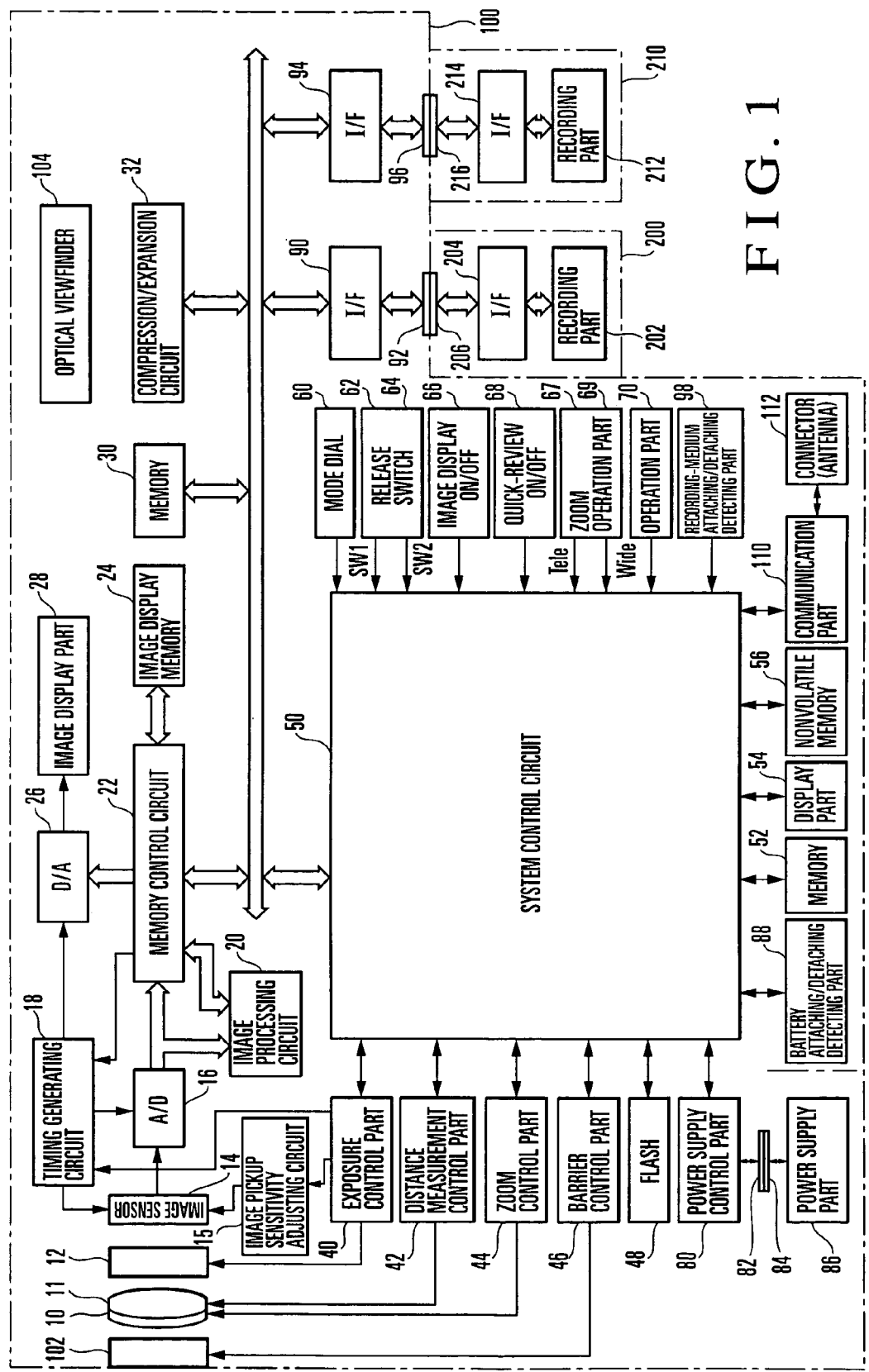
FIG. 1 is a block diagram showing the construction of an electronic camera according to an embodiment of the present invention.

Specifically, the following description will be given to explain an image pickup apparatus, a control method for controlling the image pickup apparatus, and a storage medium which stores therein a program for executing a process for controlling the image pickup apparatus, according to the embodiment of the present invention. The image pickup apparatus according to the embodiment of the present embodiment is suitable for use as an electronic camera. FIG. 1 is a block diagram showing the construction of the electronic camera according to the embodiment of the present invention. In FIG. 1, reference numeral 100 is used to denote the whole electronic camera.

A variator system lens group 10 is arranged to decide the size of an object, a focusing system lens group 11 is arranged to adjust the focus of an image. A shutter 12 for adjusting an amount of light is arranged to provide an aperture-reducing function, and an image sensor 14 is arranged to convert an optical image into an electrical signal. An image pickup sensitivity adjusting circuit 15 is arranged to adjust the sensitivity of the image sensor 14.

An A/D converter 16 is arranged to convert an analog signal outputted from the image sensor 14 into a digital signal. A timing generating circuit 18 is arranged to supply a clock signal or a control signal to the image sensor 14, the A/D converter 16 and a D/A converter 26, and is controlled by a memory control circuit 22 and a system control circuit 50.

An image processing circuit 20 is arranged to perform a predetermined pixel interpolation process and a color conversion process on data outputted from the A/D converter 16 or data outputted from the memory control circuit 22, and to perform a predetermined computing process by using picked-up image data. Further, the system control circuit 50 is arranged to perform, on the basis of a computation result obtained in the image processing circuit 20, an AF (Automatic Focus) process in the TTL (Through The Lens) manner, an AE (Automatic Exposure) process and an EF (Electronic Flash Preliminary Emission) process, so as to control an automatic exposure control part 40 and a distance measurement control part 42.

The image processing circuit 20 is also arranged to perform a computing process with the use of picked-up image data, and to perform an AWB (Automatic White Balance) process in the TTL manner in accordance with a computation result obtained.

The memory control circuit 22 is arranged to control the A/D converter 16, the timing generating circuit 18, the image processing circuit 20, an image display memory 24, the D/A converter 26, a memory 30 and a compression/expansion circuit 32. Further, data outputted from the A/D converter 16 is written into the image display memory 24 or the memory 30 through both the image processing circuit 20 and the memory control circuit 22, or directly through the memory control circuit 22.

An image display part 28 is composed of a TFT (Thin Film Transistor) type LCD. Then, image data written in the image display memory 24 is displayed on the image display part 28 through the D/A converter 26.

According to the present embodiment, by successively displaying picked-up image data on the image display part 28, it is possible to realize the function of an electronic viewfinder. Further, the image display part 28 can effect, in accordance with an instruction from the system control circuit 50, turning-on and turning-off of the display function. When the display function is made to be turned off, an electric power consumption of the electronic camera 100 can be greatly reduced.

The memory 30 is a volatile memory such as a DRAM. Further, the memory 30 has a sufficient storage capacity which is capable of storing a photographed still image or a moving image photographed in a predetermined period of time. In this way, even if a continuous shooting photography is performed for continuously photographing a plurality of still images, or even if a panorama photography is performed for combining a plurality of still images into a panoramic image, it is still possible to write image data into the memory 30 with a large amount and at a high speed. Further, the memory 30 is also allowed to be used as a working area for the system control circuit 50.

Figure 2:
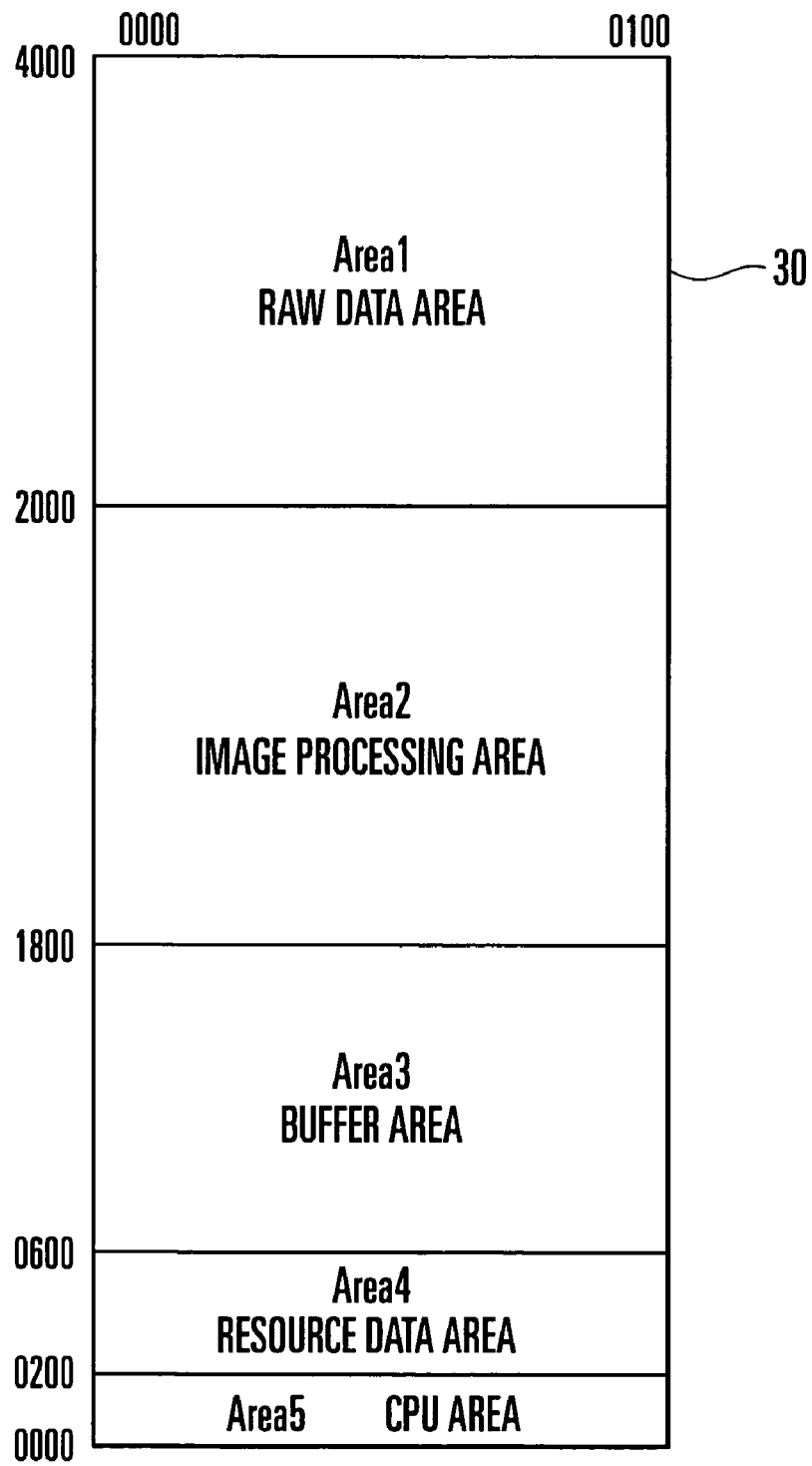
FIG. 2 is a view showing a memory map of a memory 30 in the electronic camera.

FIG. 2 is a diagram showing a memory map of the memory 30. As shown in FIG. 2, the memory 30 is composed of a raw data area (Area1) for taking in photographed raw image data, an image processing area (Area2) used for effecting image processing which includes compression processing of the taken-in image data, a buffer area (Area3) for storing therein the image-processed image data, a resource data area (Area4) for storing therein GUI resource data which is provided for use when setting some photographing parameters and setting a photographing mode to be displayed on the image display part 28, and a CPU area (Area5).

Further, in the present embodiment, although several functional areas of the memory 30 have been determined in the above manner, it is to be understood that an arrangement manner for managing a memory mounted in the electronic camera should not be limited to the above arrangement.

The compression/expansion circuit 32 is arranged to perform the compression or expansion of image data by using the ADCT (Adaptive Discrete Cosine Transform), and to read the image data stored in the image processing area (Area2) of the memory 30 to compress or expand the image data, further to write the processed data into the buffer area (Area3) of the memory 30.

The automatic exposure control part (exposure control part) 40 is arranged to control the shutter 12 having the aperture-reducing function, an electronic shutter control part for controlling a charge accumulating period extending from a charge discharging action to a charge reading action performed by the image sensor 14 in accordance with the timing generating circuit 18, and the image pickup sensitivity adjusting circuit 15, and is capable of adjusting the flash emission of the flash device 48.

The distance measurement control part 42 is arranged to control the focusing of the focusing system lens group 11. A zoom control part 44 is arranged to control the zooming of the variator system lens group 10. A barrier control part 46 is arranged to control the operation of a protecting part 102 serving as a barrier. The flash device 48 has a light projecting function for projecting AF auxiliary light and also has a function of adjusting the amount of flash light.

The system control circuit 50 controls the TTL-type exposure control part 40 and the distance measurement control part 42 on the basis of a computing result obtained by computing the picked-up image data at the image data processing circuit 20.

Further, the system control circuit 50 is arranged to control the whole electronic camera 100. The memory 52 is a ROM for storing therein constants, variables, programs and the like, which are all for use in the operation of the system control circuit 50.

Reference numeral 54 denotes a display part for displaying an operation condition and a massage in terms of characters and images, in accordance with the execution of a program of the system control circuit 50. Such a display part may be a single one or a plurality of them, located close to an operation part of the electronic camera 100 in positions easy for them to be recognized. For example, such a display part may be composed of an LCD, an LED, and a sound generating element capable of producing a warning sound.

Further, some functions of the display part 54 are disposed within an optical viewfinder 104. Contents to be displayed on the LCD among the contents to be displayed on the display part 54 include a single-shooting/continuous-shooting photography indication, a long-time photography indication, a night-scene photography indication, a self-timer indication, a compression-rate indication, a number-of-recording-pixels indication, a number-of-recorded-images indication, a number-of-remaining-photographable-frames indication, a shutter speed indication, an aperture value indication, an exposure compensation indication, a flash indication, a red-eye prevention indication (the lighting of a red-eye prevention lamp), an indication showing a passed time lasting from the last photographing operation, a macro photography indication, a buzzer setting indication, an indication showing a remaining amount of battery for use in driving a clock, an indication showing a remaining amount of battery, an error indication, a visual information in terms of a number represented by several digits, an indication showing attaching or detaching of a recording medium 200 or 210, an indication showing an operation of a communication I/F, a date and time indication, etc.

Further, contents to be displayed on the optical viewfinder 104 among the contents to be displayed on the display part 54 include an in-focus indication, a camera-shake warning indication, a flash-device charging indication, a shutter speed indication, an aperture value indication, an exposure compensation indication, etc.

A nonvolatile memory 56 is an electrically erasable or electrically recordable memory, and may be formed by an EEPROM.

A mode dial switch 60 is provided to freely effect a change-over among various function modes such as a power-off mode, an automatic photographing mode, a photographing mode, a panorama photographing mode, an image reproducing mode, an image reproducing mode with multiple pictures, an erasing mode, and a PC connecting mode.

A release switch SW1 (62) is provided such that when a release button (not shown) is half pushed, the release switch SW1 (62) is turned on so as to give an instruction to start operations for an AF (Automatic Focus) process, an AE (Automatic Exposure) process, an AWB (Automatic White Balance) process, an EF (Electronic Flash Preliminary Emission) process, etc.

A release switch SW2 (64) is provided such that when the shutter button (not shown) is completely pushed, the release switch SW2 (64) is turned on so as to give an instruction to start operations for a series of processes including a process in which a signal read from the image sensor 12 is passed through the A/D converter 16 and the memory control circuit 22 so that the raw image data (having not yet been compressed) can be written in the raw data area (Area1), a process in which a predetermined computing operation is performed in the image processing circuit 20 and the memory control circuit 22, a process in which the processed image data is read out from the image processing area (Area2) of the memory 30 and is then compressed in the compression/expansion circuit 32 so as to be stored in a predetermined position of the buffer area (Area3) of the memory 30, a recording process in which the image data is written into the recording medium 200 or 210, etc.

An image display ON/OFF switch 66 is provided to set turning-on/turning-off of the image display of the image display part 28. With the use of this function, when the optical viewfinder 104 is used when performing a photographing operation, it is possible to stop the supply of electric power to the image display part 28, which is composed of a TFT-type LCD, thereby saving electric energy.

A quick-review ON/OFF switch 68 is provided to set a quick-review function for automatically reproducing photographed image data immediately after the photographing operation.

A telephoto setting switch 67 and a wide-angle setting switch 69 are provided to give instructions for directions of driving the variator system lens group 10. In detail, the telephoto setting switch 67 and the wide-angle setting switch 69 are so mechanically designed that only one of them may be turned on at a time.

An operation part 70 is composed of various buttons and touch panels, including a menu button, a setting button, a macro/non-macro change-over button, a multiple picture reproducing page-turning button, a flash setting button, a change-over button for effecting a change-over among various modes, i.e., a single shooting photographing mode, a continuous shooting photographing mode, a self-timer mode, a long-time mode (slow shutter time mode) and a night-scene photographing mode, a menu moving + (plus) button, a menu moving − (minus) button, a reproduced image moving + (plus) button, a reproduced image moving − (minus) button, a photographed image quality selecting button, an exposure compensation button, a date/time setting button, etc.

Here, the flash setting also includes various modes, i.e., an automatic light emission mode, a forced light emission mode, a light emission inhibiting mode, a red-eye preventing automatic light emission mode, a night-scene light emission mode. When the photographing mode change-over button is operated to have the electronic camera changed over to the slow shutter time mode, the flash mode is automatically changed over to the light emission inhibiting mode. Further, when the photographing mode is changed over to the night-scene photographing mode, the flash mode is automatically changed over to the night-scene light emission mode. In fact, such a kind of construction is allowed to be modified in any manner in accordance with the design principle of the electronic camera. Further, it is of course possible to have all the necessary items allowed to be set in accordance with the requirements of the user.

A power supply control part 80 is composed of a battery detecting circuit, a DC/DC converter, a change-over switching circuit for effecting a change-over among a plurality of electrically conducting blocks, etc., thereby making it possible to detect whether or not a battery has been attached in position, the type of the battery, and a remaining amount of the battery, and to control the DC/DC converter in accordance with the detection result and an instruction of the system control circuit 50 so as to supply necessary voltages to various parts, including a recording medium, for necessary periods.

Reference numbers 82 and 84 denote connectors. A power supply part 86 is composed of a primary battery such as an alkali battery or a lithium battery, a secondary battery such as an NiCd battery, an NiMH battery or an Li battery, an AC adapter, or the like. A battery attaching/detaching detecting part 88 is arranged to detect whether or not the power supply part 86 has been attached in a predetermined position.

An interface 90 and an interface 94 are arranged to execute inputting and outputting of data to and from a recording medium such as a memory card or a hard disk. A connector 92 and a connector 96 are provided to effect a connection with the recording medium such as a memory card or a hard disk. A recording-medium attaching/detaching detecting part 98 is arranged to detect whether or not the recording medium 200 or 210 has been attached to the connector 92 or 96.

However, in the present embodiment, there has been illustrated an example involving two systems including interfaces and connectors for attaching the recording medium. The interfaces and the connectors for attaching the recording medium may be formed into either a single system or plural systems. Further, it is also possible to form a construction including interfaces and connectors which have been combined together but belong to different technical standards.

As the above interfaces and the connectors, it is allowed to use standard products such as a PCMCIA card and a CF (Compact Flash Memory) card. Further, when the interfaces 90 and 94 and the connectors 92 and 96 are formed by employing standard products such as a PCMCIA card and a CF (Compact Flash Memory) card, it is allowed to connect various communication cards such as a LAN card and a modem card, a USB card, an IEEE 1394 card, a P1284 card, an SCSI card, a PHS card, so as to effect mutual transmission for transmitting image data and other relevant management information between the electronic camera and other peripheral equipments such as another computer and a printer.

Further, the battery attaching/detaching detecting part 88 and the recording-medium attaching/detaching detecting part 98 are formed by switches attached on the main body of the electronic camera 100, in such a manner as to detect the opening or closing of a lid of a portion in which the power supply part or the recording medium is mounted.

The barrier (protecting part) 102 is arranged to prevent a possible polluting or damaging of an image pickup portion, including the variator system lens group 10 and the focusing system lens group 11, of the electronic camera 100, by covering the image pickup portion.

The optical viewfinder 104 is provided to enable the user to optically observe an object. In detail, the optical viewfinder 104 contains part of the functions of the display part 54, i.e., an in-focus indication, a camera-shake warning indication, a flash-device charging indication, a shutter speed indication, an aperture-value indication, an exposure compensation indication, a macro photography setting indication, etc.

A communication part 110 has various communication functions such as RS232C, USB, IEEE1394, P1284, SCSI, modem, LAN and radio communication.

A connector 112 is provided for connecting the electronic camera 100 to other apparatuses by means of the communication part 110, and can also be used as an antenna when conducting radio communication.

The recording medium 200 is a nonvolatile recording medium, such as a memory card and a hard disk, which can be attached to or detached from a predetermined position in the electronic camera 100. In detail, the recording medium 200 has a recording part 202 composed of a semiconductor memory or a magnetic disk, an interface 204 for connection with the electronic camera 100, and a connector 206 to be used for connection with the electronic camera 100.

In addition, the recording medium 210 is similar to the recording medium 200, having a recording part 212, an interface 214 and a connector 216.

Figure 3:
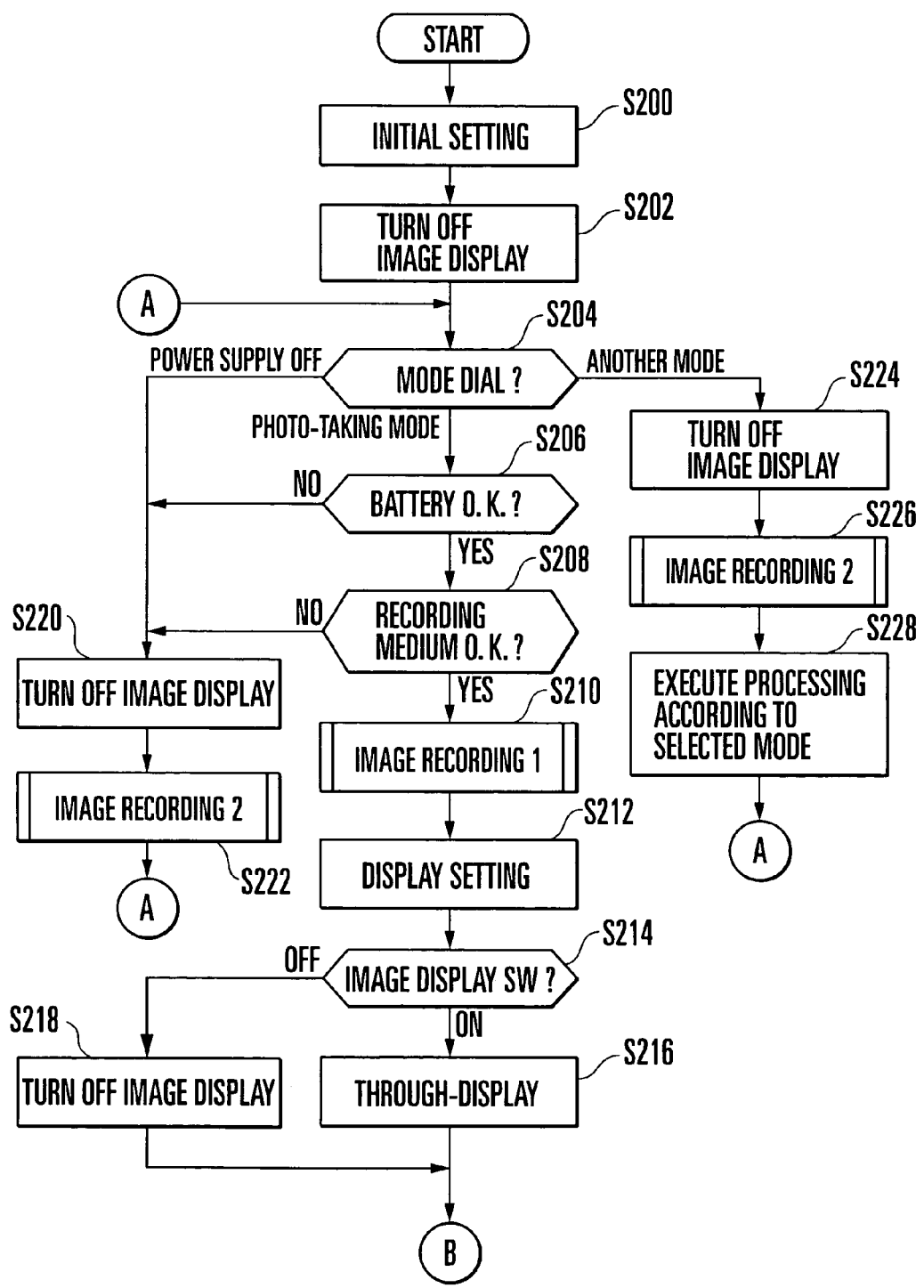
FIG. 3 is a flow chart showing a procedure for carrying out a process for an image pickup operation, which procedure is a main routine of the electronic camera 100 according to the embodiment of the present invention.
Figure 4:
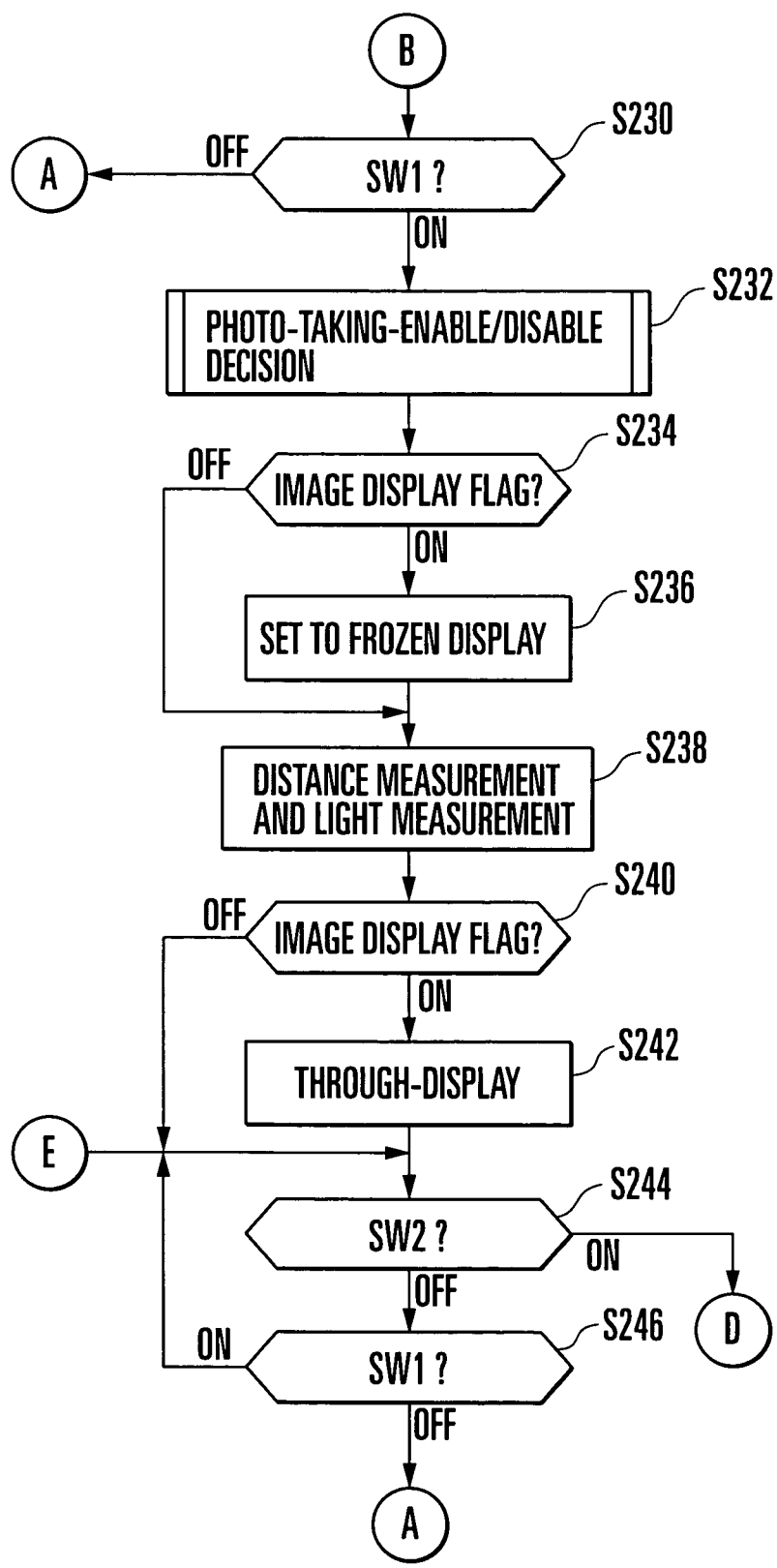
FIG. 4 is a flow chart showing a procedure to be continued after the procedure of FIG. 3, for carrying out the process for the image pickup operation, which procedure is a main routine of the electronic camera 100 according to the embodiment of the present invention.
Figure 5:
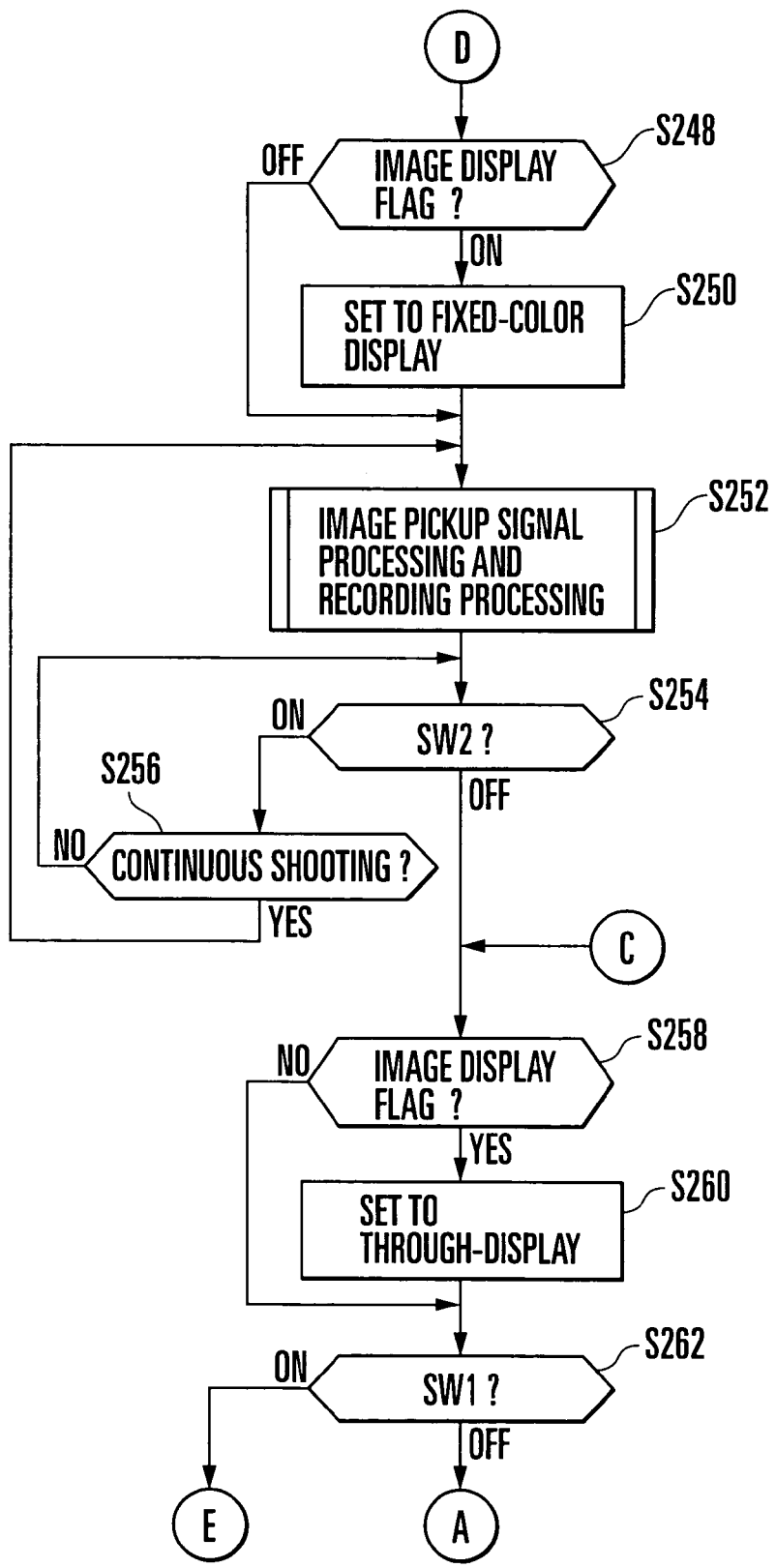
FIG. 5 is a flow chart showing a procedure to be continued after the procedures of FIG. 3 and FIG. 4, for carrying out the process for the image pickup operation, which procedure is a main routine of the electronic camera 100 according to the embodiment of the present invention.

FIG. 3, FIG. 4 and FIG. 5 are flow charts showing an image pickup process which is in fact a main routine of the electronic camera 100. A program for the image pickup process is stored in the memory 52, and the image pickup process is executed by the system control circuit 50, which contains a CPU.

The system control circuit 50 starts the image pickup process in response to the turning-on of the power supply, such as the replacement of batteries. In detail, the process can by described in the following. First, flags, control variables, etc., are initialized (step S200). Then, the image display of the image display part 28 is initially set to an off-state (step S202).

Further, the system control circuit 50 operates to detect a setting position of the mode dial switch 60 (step S204). When the mode dial switch 60 is set at a power-off position, the image display of the image display part 28 is set to the off-state (step S220) according to the setting of the mode dial switch 60. After a process of image recording 2 (which is to be described later) has been carried out, the display part 54 is changed into an ending state, and the protecting part 102 which is a barrier is closed so as to protect the image pickup portion. At this time, some necessary parameters containing flags and controlling variables, the setting values and the mode are recorded in the nonvolatile memory 56, and unnecessary power sources in various parts such as the image display part 28 are shut off by the power supply control part 80, thereby performing the predetermined ending process (step S222). After that, the flow returns to the process of step S204.

On the other hand, when at step S204 the mode dial switch 60 is set to one of other modes than the photographing mode and the power-off mode, the image display of the image display part 28 is set to the off-state (step S224) according to the setting of the mode dial switch 60, and the process for image recording 2 (which is to be described later) is carried out (step S226). Subsequently, the system control circuit 50 executes a process according to a selected mode (step S228). After finishing the above process, the flow returns to the process of step S204.

Here, an operation for closing the barrier of the protecting part 102 will be described. Before operating the protecting part 102, the system control circuit 50, in order to stow the lens groups 10 and 11, which are not needed to be used, in the camera 100, detects the respective positions of the variator system lens group 10 and the focusing system lens group 11. When the system control circuit 50 has determined that the variator system lens group 10 has been drawn out, the focusing system lens group 11 is first drawn in up to a barrel-retracted standby position, and, after that, the variator system lens group 10 is drawn in up to a barrel-retracted position. At this moment, in synchronism with the drawing-in of the variator system lens group 10, the barrier of the protecting part 102 is closed. In the present embodiment, although the protecting part 102 serving as a barrier is driven by the barrier control part 46 which is independently provided, such a protecting part may be mechanically interlocked with the driving of the variator system lens group 10.

On the other hand, when at step S204 the mode dial switch 60 has been set at the photographing mode, the system control circuit 50 operates, through the power supply control part 80, to determine whether or not the power supply part 86 such as a battery will cause, due to its insufficient remaining amount, any troubles to the operation of the electronic camera 100 (step S206).

When no problem is found in the power supply part 86, the system control circuit 50 operates to determine whether or not the operating state of the recording medium 200 or 210 will bring about any problems in the operation of the electronic camera 100, in particular, the recording and reproducing operation for image data with respect to the recording medium (step S208).

When there are not any problems in the operating state of the recording medium 200 or 210, a process of image recording 1 (which will be described later) is performed (step S210), and the display part 54 is caused to display the various setting states of the electronic camera 100 with their images or sounds (step S212).

Then, it is determined whether the image display of the image display part 28 is tuned on or not (step S214). If the image display of the image display part 28 is tuned on, the image display part 28 is caused to display the various setting states of the electronic camera 100 with their images or sounds (step S216).

On the other hand, if it is determined at step S206 that there is a problem in the power supply part 86, or if it is determined at step S208 that there is a problem in the recording medium 200 or 210, the image display of the image display part 28 is set to the off-state (step S220). After the process of image recording 2 (which will be described later) has been carried out (step S222), the flow returns to the process of step S204.

Here, an operation for the image recording 1 and an operation for the image recording 2 will be described below.

Figure 6:
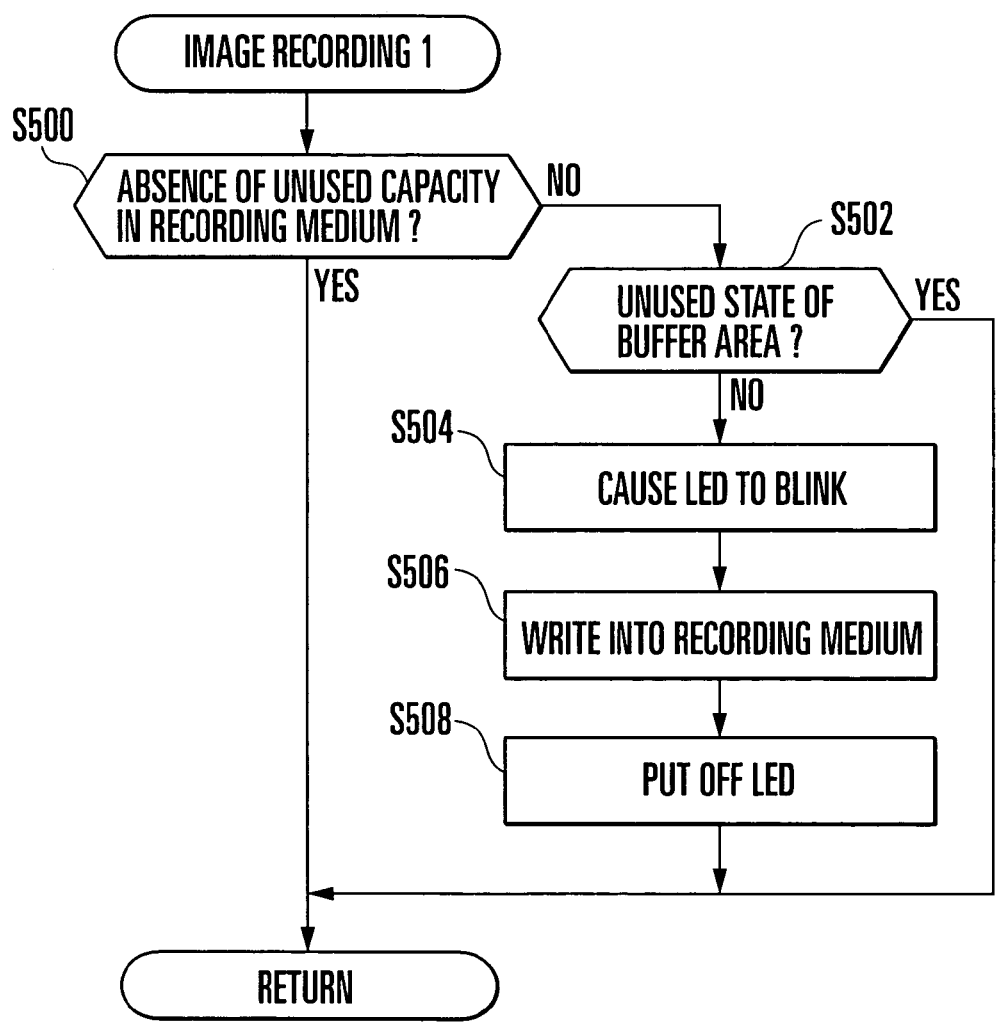
FIG. 6 is a flow chart showing a procedure for carrying out a process for image recording 1.

FIG. 6 is a flow chart showing a procedure for carrying out a process for the image recording 1.

First, determination is conducted to find whether or not there is any unused capacity in the recording medium 200 or the recording medium 210 (step S500). Namely, determination is carried out to find whether or not there is existing any unused capacity in the recording medium 200 or 211 according to the size of a photographed image, the presence/absence of compression/non-compression, and a compression ratio if image data is to be compressed. If it is determined that there is not existing any unused capacity in the recording medium 200 or the recording medium 210, the present process is terminated, so that the flow returns to the main routine without performing any processing.

On the other hand, if it is determined that there is existing a predetermined unused capacity in the recording medium 200 or the recording medium 210, the present using state of the buffer area (Area3) of the memory 30 is detected and determined (step S502). If it is determined that the buffer area is not in use, the present process is terminated, and the flow returns to the main routine without performing any other processing. On the other hand, if it is determined that the buffer area (Area3) of memory 30 is just in use, the system control circuit 50 operates to cause an LED disposed within the display part 54 for indicating the access to a recording medium to blink (step S504).

Further, image data within the buffer area (Area3) of the memory 30 corresponding to data to be written into a recording medium is written, at integral number times of the smallest file size, into a file stream stored in an internal memory of the system control circuit 50 or the CPU area (Area5) of the memory 30 (step S506).

After the recording process on the above recording medium with the smallest unit is performed, the LED for indicating the access to a recording medium, which has been caused to blink, is turned off (step S508). Then, an image buffer having a writing-in process finished after the above recording process is opened so as to re-store a writing-in leading address. Further, after a writing-in process with respect to a corresponding file is finished, the file stream is closed, and, at the same time, a file stream to be next written and an address of corresponding image data are re-stored. Incidentally, when there is no image data to be written, it is not necessary to re-store the above data. Further, a memory in the buffer area having the written image data is opened. In the above-described way, image data accumulated in the buffer area (Area3) within the memory 30 is successively recorded in the recording medium 200 or the recording medium 210 with the smallest unit.

Figure 7:
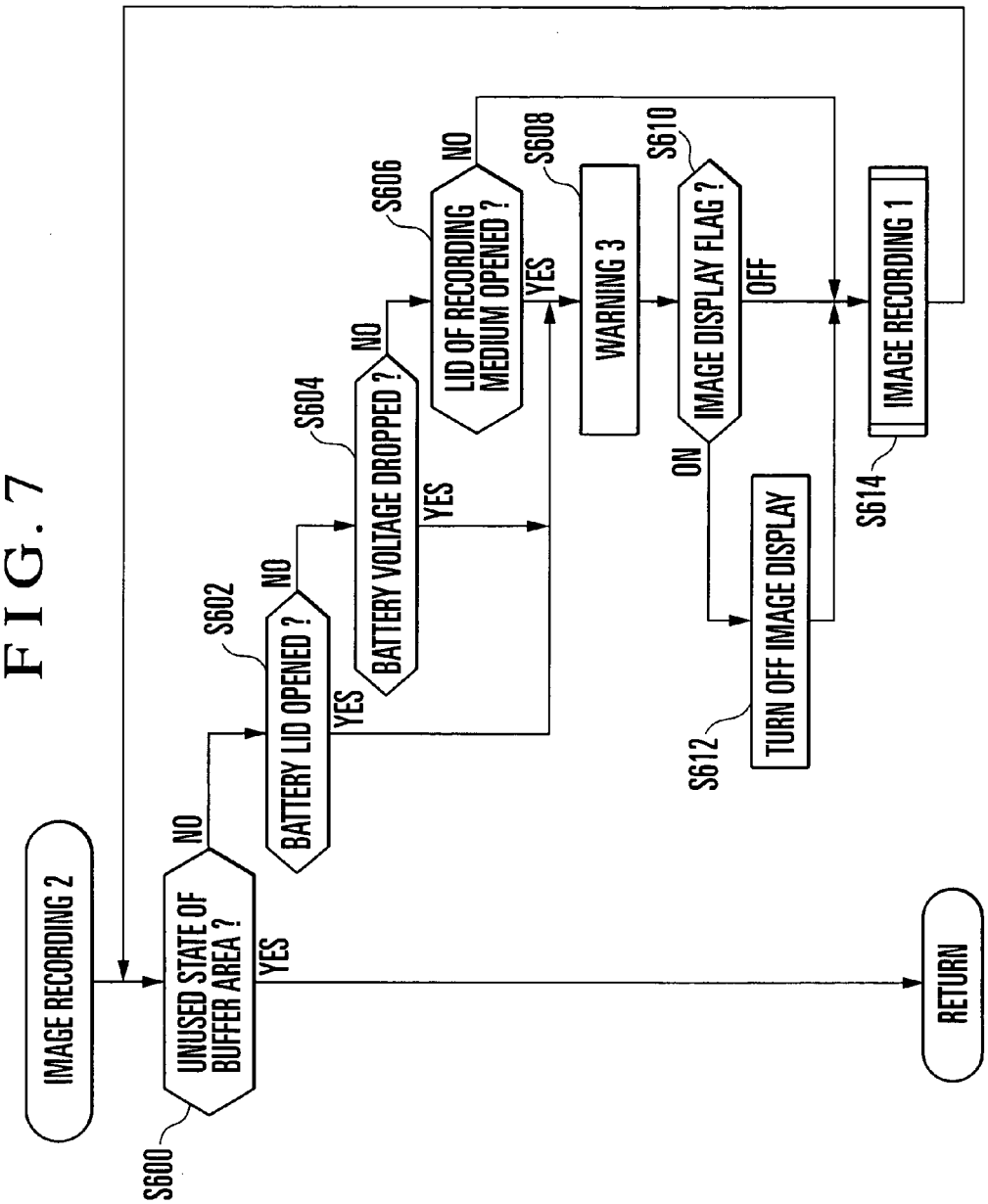
FIG. 7 is a flow chart showing a procedure for carrying out a process for image recording 2.

FIG. 7 is a flow chart showing a procedure for carrying out a process for the image recording 2. First, the present using state of the buffer area (Area3) of the memory 30 is determined (step S600). If it is determined that the buffer area (Area3) is not in use, the flow returns to the main routine without performing any processing.

On the other hand, if it has been determined that image data is existing in the buffer area (Area3) of the memory 30, it is further determined by the battery attaching/detaching detecting part 88 whether or not the lid of a portion in which the power supply part 86 is to be mounted is opened (step S602). If it has been determined that the lid is not opened, it is further determined whether or not the voltage of the power supply part 86 has been dropped (Step S604).

If it is not fount that the voltage of the power supply part 86 has been dropped, it is determined by the recording-medium attaching/detaching detecting part 98 whether or not the lid of a portion in which the recording medium is to be mounted is opened (step S606). If it is determined that the lid is not opened, the process for the image recording 1 is performed (step S614), and the flow returns to the process of step S600.

On the other hand, if it is determined at step S602 that the lid of the portion in which the power supply part 86 is to be mounted is opened, or if it is found at step S604 that the voltage of the power supply part 86 has been dropped, or if it is detected at step S606 that the lid of the portion in which the recording medium is to be mounted is opened, a sound emitting element of the display part 54 is caused to continuously emit a sound so as to give the user a warning (step S608). Then, an image display flag which is set depending upon the setting state of the image display ON/OFF switch 66 is examined (step S610).

If the image display flag is set in the on-state, the image display of the image display part 28 is set to the off-state (step S612). After that, a process for the image recording 1 is performed (step S614), so that the flow returns to the process of step S600. In the above-described way, photographed image data is surely recorded in the recording medium.

At step S214 of the main routine, the system control circuit 50 operates to examine the setting state of the image display ON/FF switch 66. If it is found that the switch 66 is in the on-state, the image display of the image display part 28 is set to the on-state so as to provide a through-display state for successively displaying photographed image data (step S216), and the flow proceeds to a process of step S230.

In the through-display state, data which has been successively written in the image display memory 24 by means of the image sensor 12, the A/D converter 16, the image processing circuit 20 and the memory control circuit 22 is successively displayed on the image display part 28 by means of the memory control circuit 22 and the D/A converter 26, thereby realizing an electronic viewfinder function.

On the other hand, if at step S214 the image display ON/FF switch 66 is set in the off-state, the image display flag is canceled and the image display of the image display part 28 is set to the off-state (step S218), and the flow proceeds to a process of step S230. Incidentally, the state of the image display flag or the like is stored in the internal memory of the system control circuit 50 or the CPU area (Area5) of the memory 30.

If it is detected at step S230 that the release switch SW1 has not been pushed, the flow returns to the process of step S204. On other hand, if it is detected that the release switch SW1 has been pushed, the system control circuit 50 operates to perform a photo-taking-enabling/disabling decision (which will be described later) (step S232). Then, the present state of the image display flag stored in the internal memory of the system control circuit 50 or the CPU area (Area5) of the memory 30 is detected (step S234). If it is detected that the image display flag has been set, the image display part 28 is set to a frozen display state (step S236).

Figure 8:
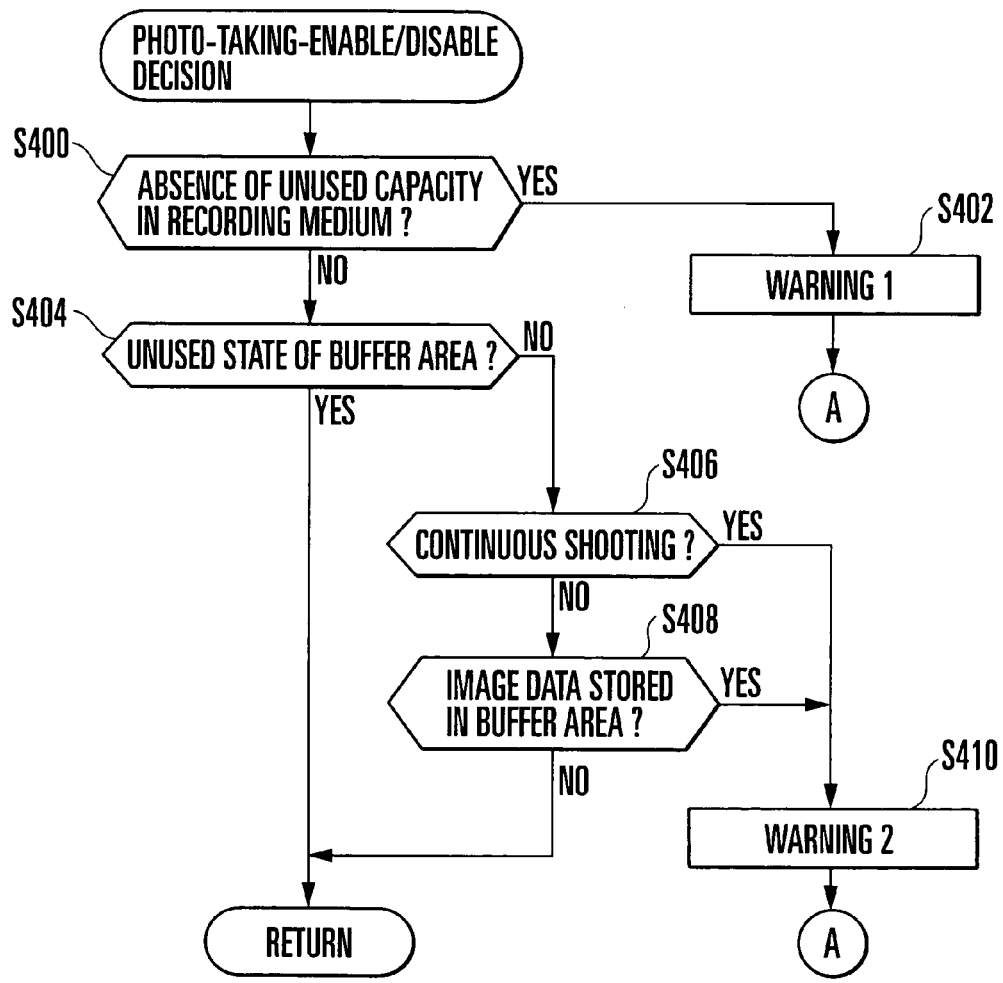
FIG. 8 is a flow chart showing a procedure for carrying out a process for photo-taking-enable/disable decision.

FIG. 8 is a flow chart showing a procedure for carrying out the photo-taking-enabling/disabling decision.

First, determination is performed to find whether or not there is any unused capacity in the recording medium 200 or the recording medium 210 which is subjected to recording (step S400). Namely, determination is carried out to find whether or not there is existing any unused capacity in the recording medium 200 or 211 according to the size of a photographed image, the presence/absence of compression/non-compression, and a compression ratio if image data is to be compressed.

If it is determined that there is not existing any unused capacity, the sound emitting element of the display part 54 is caused to emit a sound intermittently for several times (for example, six times), so as to give the user a warning indicating that there is no unused capacity existing in the recording medium 200 or the recording medium 210 (step S402), and the flow returns to the process of step S204.

On the other hand, if it is determined at step S400 that there is existing a predetermined unused capacity in the recording medium 200 or the recording medium 210, the using state of the buffer area (Area3) of the memory 30 is detected and determined (step S404). If it is determined that the buffer area (Area3) is not in use, the flow returns to the process of step S234.

On the other hand, if it is determined at step S404 that image data is existing in the buffer area (Area3) of the memory 30, it is further determined whether or not the present mode of the electronic camera is the continuous shooting photographing mode (step S406). If the electronic camera is not in the continuous shooting photographing mode, it is determined whether or not predetermined image data has been stored in the buffer area (Area3) of the memory 30 (step S408). If it is determined that there is an unused capacity in the buffer area (Area3) of the memory 30, the flow returns to the process of step S234.

On the other hand, if it is determined at step S406 that the electronic camera is in the continuous shooting photographing mode, or if it is determined that there is not any unused capacity in the buffer area (Area3) of the memory 30, the sound emitting element of the display part 54 is caused to emit a sound intermittently for several times (for example, four times), so as to give the user a warning indicating that the image buffer has been full (step S410), and the flow returns to the process of step S204.

In the frozen display state at step S236, a re-writing of image data of the image display memory 24 through the image sensor 12, the A/D converter 16, the image processing circuit 20 and the memory control circuit 22 is inhibited, and the finally-written image data is thus displayed on the image display part 28 through the memory control circuit 22 and the D/A converter 26.

On the other hand, when it is found at the step S234 that the image display flag has been canceled, distance measurement and light measurement are carried out (step S238). The distance measurement and the light measurement are know methods in the art, and, since these methods are not directly related to the present invention, the detailed description thereof will be omitted in the following.

Once the distance measurement and the light measurement are finished, the system control circuit 50 operates to detect the state of the image display flag stored in the internal memory of the system control circuit 50 or in the CPU area (Area5) of the memory 30 (step S240). If it is determined that the image display flag has been set already, the image display of the image display part 28 is set to a through-display state (step S242). Incidentally, such a through-display state at step S242 is the same operation state as the through-display state at step S216.

Next, the state of the release switch SW1 and the state of the release switch SW2 are detected (step S244 and step S246). If the release switch SW2 is not pushed and the release switch SW1 is canceled, the flow returns to the process of step S204.

On the other hand, if at step S244 the release switch SW2 has been pushed, the system control circuit 50 operates to detect the state of the image display flag stored in the internal memory of the system control circuit 50 or in the CPU area (Area5) of the memory 30 (step S248). If it is determined that the image display flag has been set already, the display state of the image display part 28 is set to a fixed-color display state (step S250).

In the fixed-color display state, instead of the photographed image data written in the image display memory 24 through the image sensor 12, the A/D converter 16, the image processing circuit 20 and the memory control circuit 22, fixed-color image data is displayed on the image display part 28 through the memory control circuit 22 and the D/A converter 26, thereby displaying a fixed-color image on the electronic viewfinder. On the other hand, if it is found at step S248 that the image display flag has been canceled, the flow proceeds to a process of step S252.

The system control circuit 50 performs a photographing processing operation for writing raw image data into the raw data area (Area1) of the memory 30 through the image sensor 12, the A/D converter 16, the image processing circuit 20 and the memory control circuit 22, or through a route from the A/D converter 16 directly to the memory control circuit 22, various image processing operations for reading out the image data written in the raw data area (Area1) of the memory 30 and processing the image data through the memory control circuit 22 and the image processing circuit 20, and an image data compressing process corresponding to a mode which has been set with the use of the compression/expansion circuit 32 in the image processing area (Area2) of the memory 30. Then, according to necessity, the system control circuit 50 performs either a storing process for transferring the image data to the buffer area (Area3) of the memory 30, or a recording process for writing the image data into the recording medium 200 or the recording medium 210 (step S252).

Figure 9:
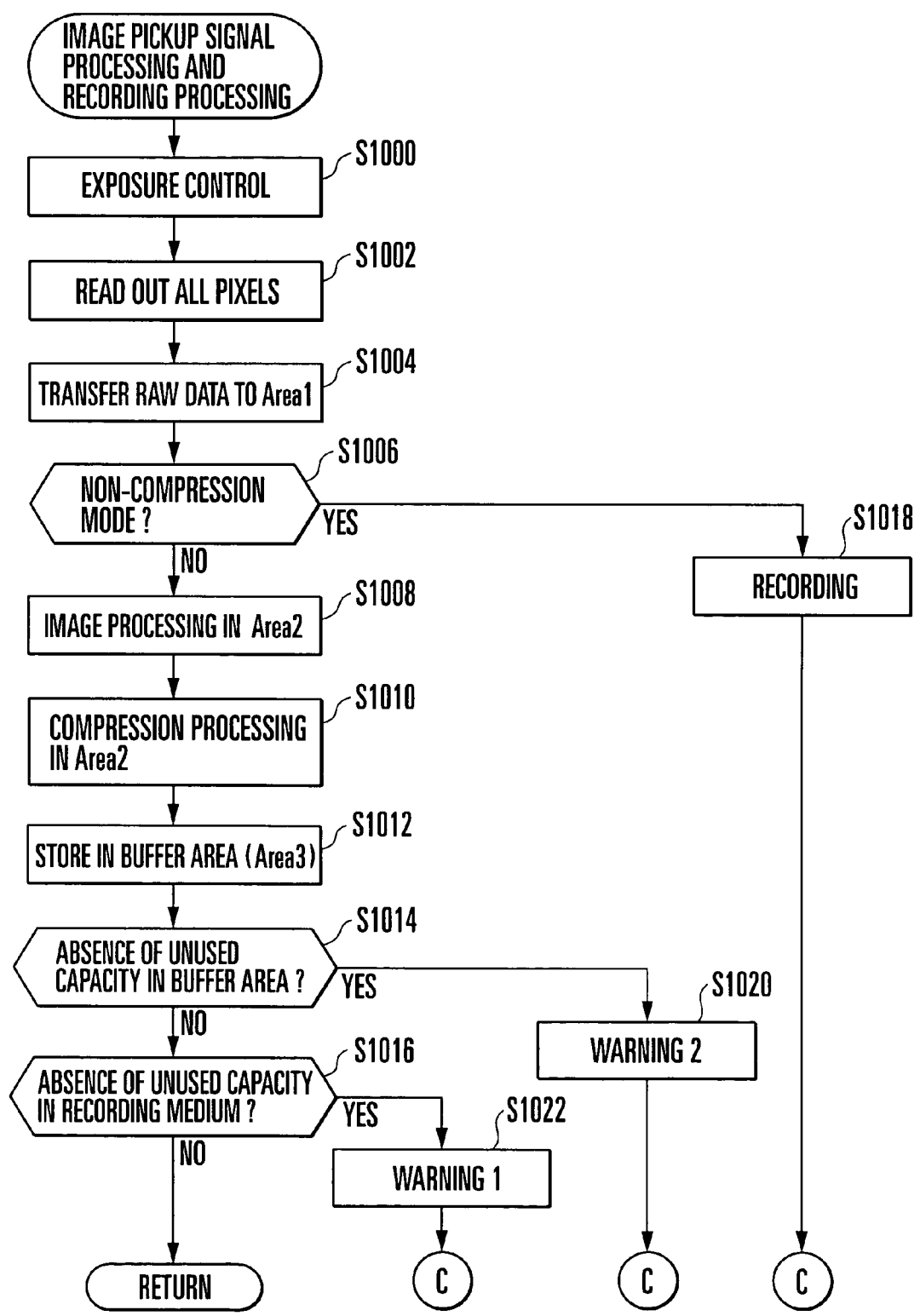
FIG. 9 is a flow chart showing a procedure for carrying out an operation for image pickup signal processing and recording processing at step S252.

FIG. 9 is a flow chart showing a procedure for carrying out the image pickup signal processing and recording processing operation at step S252. As described in the above, the system control circuit 50 operates to read out image data by reading out all the pixels from the image sensor 12, and to take the photographed image data (uncompressed image data) in the raw data area (Area1) of the memory 30 through the A/D converter 16, the image processing circuit 20 and the memory control circuit 22, or through a route from the A/D converter 16 directly to the memory control circuit 22 (steps S1000 to S1004).

Further, the system control circuit 50 operates to determine whether or not the electronic camera is in a non-compression mode, on the basis of the size of a photographed image, the presence/absence of compression/non-compression, and a compression ratio if image data is to be compressed (step S1006). If it is determined that the electronic camera is in the non-compression mode, the image data which has been taken in the raw data area (Area1) of the memory 30 is recorded in the recording medium 200 or the recording medium 210 (S1018).

On the other hand, if it is determined at step S1006 that the electronic camera is not in the non-compression mode, the raw image data written in the raw data area (Area1) of the memory 30 is read out, and various image processing operations are effected using the memory control circuit 22 or, if necessary, using the image processing circuit 20, or an image data compressing process corresponding to a mode set is performed with the use of the compression/expansion circuit 32, in the image processing area (Area2) of the memory 30 (step S1008, step S1010).

The image data on which the image processing operation has been finished is transferred through the memory control circuit 22 to the buffer area (Area3) of the memory 30 (step S1012). At this time, the system control circuit 50 operates to in advance obtain, from the buffer area (Area3) of the memory 30, an area composed of several buffers each having the same size as the smallest file size of the recording medium. The plurality of buffers are then deemed to be continuous virtual line buffers, in which the image data on which the image processing operation has been finished is stored in units of the smallest file. Further, among the plurality of buffers obtained after the storing process, buffers in which image data has not been written are opened.

Upon the ending of all the image processing operations, it is determined whether or not there is existing an unused capacity for storing predetermined image data in the buffer area (Area3) of the memory 30 into which the photographed image data has already been transferred (step S1014). If there is no unused capacity, the sound emitting element of the display part 54 is caused to emit a sound intermittently for a predetermined number of times (for example, four times), so as to give the user a warning indicating that the image buffer has already been full (step S1020). By virtue of this warning, the user is informed that the next photographing operation will not be allowed until there occurs a vacant buffer, i.e., until image data is actually recorded in the recording medium 200 or the recording medium 210.

On the other hand, if it is determined at step S1014 that there is an unused capacity for storing predetermined image data in the buffer area (Area3) of the memory 30, it is further determined whether or not there is an unused capacity for recording predetermined image data in the recording medium 200 or the recording medium 210 when the present image data within the buffer area (Area3) of the memory 30 is recorded in the recording medium 200 or the recording medium 210 (step S1016).

If it is determined that there is no unused capacity, the sound emitting element of the display part 54 is caused to emit a sound intermittently for a predetermined number of times (for example, six times), so as to give the user a warning indicating that the recording medium 200 or the recording medium 210 has already been full (step S1022), thereby informing that the refusal of a photographing operation is not because the image buffer has been full.

When the photographing operation, the image processing operation, the compressing process, the storing process and the recording process at step S252 are finished, it is determined whether or not the release switch SW2 has been pushed down (step S254).

If it is determined that the release switch SW2 has been pushed down, the state of a continuous shooting flag stored in the internal memory of the system control circuit 50 or in the CPU area (Area5) of the memory 30 is detected (step S256). If it is determined that the continuous shooting flag has been set, the flow returns to the process of step S252 so as to continuously effect a desired photographing operation, thereby effecting the next photographing operation. On the other hand, if it is determined at step S256 that the continuous shooting flag has not been set, the present processes (step S254 and step S256) are repeated until the release switch SW2 is opened.

Further, on the other hand, if the release switch SW2 is opened when the photographing process, the compressing process and the recording process of the step S252 have been finished, the system control circuit 50 operates to determine whether or not the image display flag has been set (step S258).

If the image display flag has been set, the display state of the image display part 28 is set to the through-display state (step S260), and the flow proceeds to a process of step S262. On the other hand, if the image display flag has been canceled, the flow proceeds to the process of step S262 without performing any processing.

In addition, in order to confirm a photographed image, it is also possible that the photographed image may be displayed between the process of step S252 and the process of step S254. Further, it is also possible that the image display confirmation may be selected by the setting by the user.

Then, it is determined whether or not the release switch SW1 has been pushed down (step S262). If the release switch SW1 has been pushed down, the system control circuit 50 causes the flow to return to the process of step S244 so as to make preparation for the next photographing operation. On the other hand, if the release switch SW1 is in the opened state, the system control circuit 50 operates to bring a series of photographing operations to an end, thereby causing the flow to proceed to the process of step S204.

In the manner as described above, the photographed image data is temporarily stored in the buffer area of the memory 30, and, then, the image data temporarily stored in the buffer area is in turn recorded in the recording medium 200 and or the recording medium 210 during a vacant period of time in which a photographing process or a photographing mode setting is not performed, in a time-divisional manner. By this arrangement, the user will not feel lost or get into any trouble, which will otherwise be encountered by him or her as a result of a long recording period of time needed by a large amount of image data, thus making it possible to first perform a photographing operation or to set another photographing mode in preference.

Further, when the electronic camera is changed over to a mode other than the photographing mode, such as a power-off mode or a reproducing mode, the above temporarily recorded image is first recorded in a recording medium in preference to the other operation, so that it is possible to surely preserve photographed images. Moreover, it is possible for the user to confirm or to enjoy the photographed images, by virtue of functions which are different from the function of the photographing operation.

In addition, clearly-different warnings are given to the user to discriminate between the inhibition of the photographing operation in a case where the buffer area of the memory has become full with image data obtained by continuously performing the recording operation and the inhibition of the photographing operation in a case where the recording medium 200 or the recording medium 210 mounted for recording image data therein has become full with image data. Accordingly, it is possible to exactly inform the user of what the electronic camera is expecting the user to do.

Further, under a condition in which a temporalily recorded image data is existing in the buffer area of the memory 30, if the emergency condition of the electronic camera has been detected, for example, if the voltage of the power supply part has dropped to a value which is lower than a voltage necessary to carry out a photographing process, or if the power supply part has been detached from the electronic camera, or if the recording medium has been detached from the electronic camera, it is possible to inform the user of the present internal state of the electronic camera by giving a warning which is different from the warning to be given when the buffer area of the memory 30 has become full with image data or when the recording medium 200 or the recording medium 210 has become full with image data.

Further, a plurality of image buffer areas are formed in the same size as the smallest file size of the recording medium, and a recording process is performed in units of integral number times of the smallest file size. Accordingly, it is possible to circulate the image buffer areas with a high efficiency, so as to realize a smooth photographing operation.

In addition, in the present embodiment, when the electronic camera is in the non-compression mode, image data is first recorded in a recording medium, and, after that, the next photographing process is permitted. However, if a total capacity of the memory 30 is more than several times the photographed raw image data, the next photographing process may be permitted after the image data is recorded in the buffer area (Area3) of the memory 30.

In addition, in the present embodiment, if image data which has not yet been recorded in the recording medium is existing in the image buffer area during the continuous shooting photographing mode, the continuous shooting photographing process is inhibited. However, it is not necessary to inhibit the continuous shooting photographing process, depending on the total capacity of the memory 30.

Further, the recording medium 200 or the recording medium 210 is not necessarily required to be in the form of a memory card, such as a PCMCIA card or a compact flash memory, or a hard disk. In fact, it is also possible to use an optical disk, such as a micro DAT, a magneto-optical disk, a CD-R, a CD-WR, or to use a phase-changeable optical disk, such as a DVD. Moreover, the recording medium 200 or the recording medium 210 may be formed into an integral composite medium including a memory card, a hard disk, etc. In addition, such an integral composite medium may be formed such that a part thereof is detachable.

Although in the present embodiment, the recording medium 200 or the recording medium 210 is a recording medium which is freely attachable to and detachable from the electronic camera 100, it is in fact possible that one or all of the recording media may remain fixed to the electronic camera 100. Further, a plurality of pairs of the recording medium 200 and the recording medium 210 may be connected to the electronic camera 100.

Further, the present invention may be applied to a system composed of a plurality of apparatuses or a system consisting of only one apparatus. Moreover, the present invention of course may be applied to a case where the present invention is achievable by supplying a program to a system or an apparatus. In this case, when a storage medium containing a program represented by software for achieving the present invention is read out into the system or the apparatus, such a system or an apparatus can obtain an effect intended by the present invention.

Figure 10:
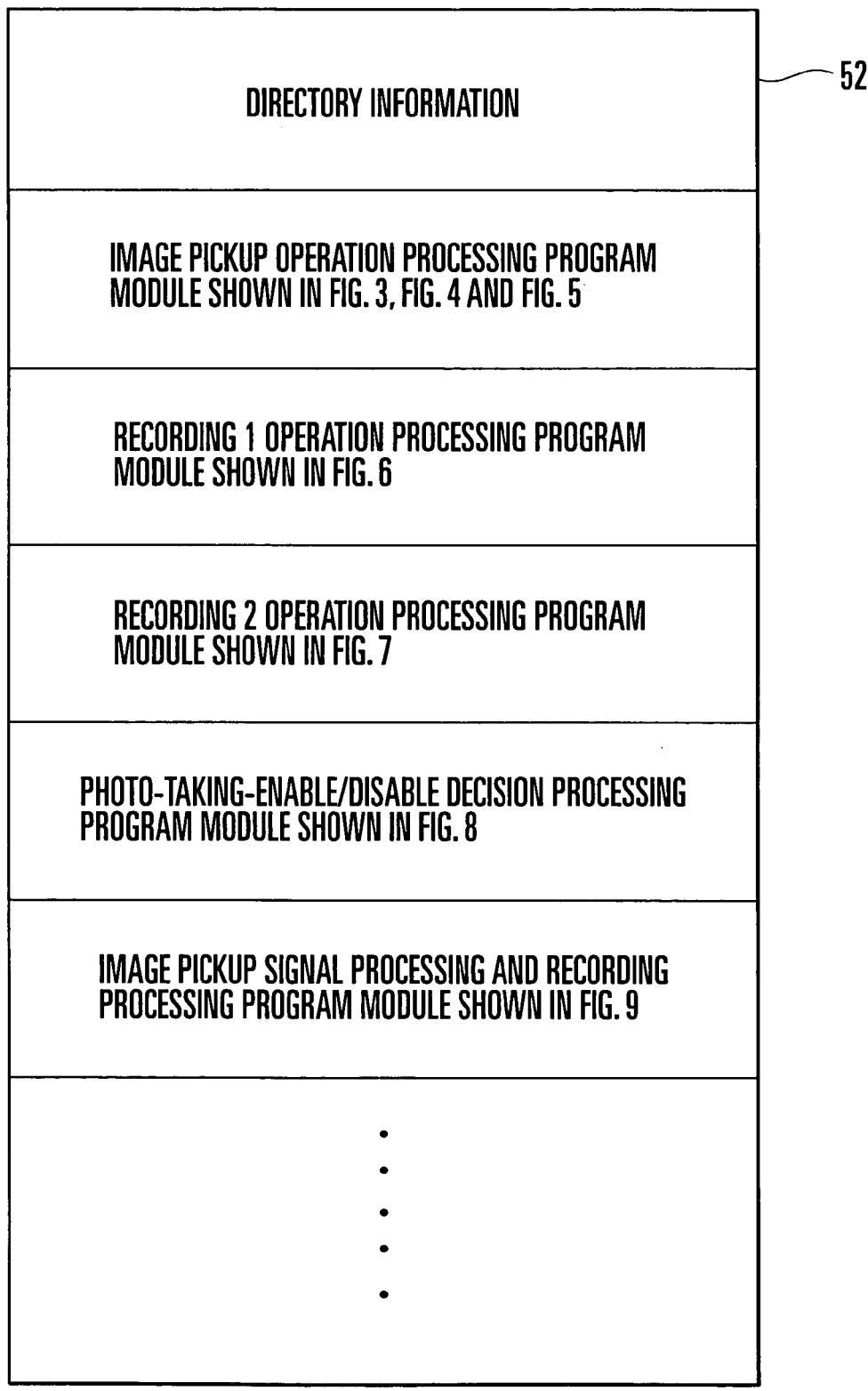
FIG. 10 is a view showing a memory map of a ROM 52 serving as a storage medium.

FIG. 10 is a view showing a memory map of the ROM 52 serving as a storage medium. In the ROM 52, there are stored an image pickup operation processing program module as shown in the flow charts of FIG. 3, FIG. 4 and FIG. 5, a recording 1 operation processing program module as shown in the flow chart of FIG. 6, a recording 2 operation processing program module as shown in the flow chart of FIG. 7, a photo-taking-enable/disable decision processing program module as shown in the flow chart of FIG. 8, an image pickup signal processing and recording processing program module as shown in the flow chart of FIG. 9, etc.

As a storage medium for supplying the program modules, there can be used a floppy disk, a hard disk, an optical disk, a magneto-optical disk, a CD-ROM, a CD-R, a DVD, a magnetic tape, a nonvolatile memory card, or the like.

As has been described in the foregoing, in an electronic camera arranged to record a photographed image in a recording medium after temporarily storing the photographed image, such a condition that the temporarily-stored image is existing without being recorded in the recording medium as yet can be clearly presented to the user, and it is possible to surely record the photographed image in the recording medium.

The invention claimed is:

1. An image sensing apparatus comprising:
   an image pickup part capable of picking up image data of an object;
   a volatile recording medium capable of temporarily recording therein the image data picked up by said image pickup part;
   a recording part capable of recording the image data recorded in said volatile recording medium to a nonvolatile recording medium;
   a change-over part capable of changing over between an image capture mode and a reproduction mode of said image sensing apparatus; and
   a control part capable of if the image capture mode has been changed over to the reproduction mode by said change-over part before finishing writing-in of the image data recorded in said volatile recording medium into said nonvolatile recording medium, executing the reproduction mode, after finishing writing-in of the image data recorded in said volatile recording medium into said nonvolatile recording medium.

2. A method for controlling an image sensing apparatus, said method comprising the steps of:

picking up image data of an object;

temporarily recording the image data picked up in a volatile recording medium;

recording the image data recorded in the volatile recording medium to a nonvolatile recording medium;

changing over between an image capture mode and a reproduction mode; and if the image capture mode has been changed over to the reproduction mode before finishing writing-in of image data recorded in said volatile recording medium into said nonvolatile recording medium, executing the reproduction mode, after finishing writing-in of the image data recorded in said volatile recording medium into said nonvolatile recording medium.

3. A computer readable medium stored thereon a computer program comprising a set of instructions when executed by a computer program to implement a process for controlling an image sensing apparatus, said process comprising:

picking up image data of an object;

temporarily recording the image data picked up in a volatile recording medium;

recording the image data recorded in the volatile recording medium to a nonvolatile recording medium;

changing over between an image capture mode and a reproduction mode; and if the image capture mode has been changed over to the reproduction mode before finishing writing-in of image data recorded in said volatile recording medium into said nonvolatile recording medium, executing the reproduction mode, after finishing writing-in of the image data recorded in said volatile recording medium into said nonvolatile recording medium.

* * * * *

UNITED STATES PATENT AND TRADEMARK OFFICE
CERTIFICATE OF CORRECTION

| | |
|---|---|
| PATENT NO. | : 7,015,959 B1 |
| APPLICATION NO. | : 09/531283 |
| DATED | : March 21, 2006 |
| INVENTOR(S) | : Masahiko Morita |

It is certified that error appears in the above-identified patent and that said Letters Patent is hereby corrected as shown below:

Column 10, line 42, delete "not fount" and insert --not found--

Column 11, line 3, and line 17, delete "display ON/FF" and insert --display ON/OFF--

Column 12, line 23, delete "measurement are know" and insert --measurement are known--

Signed and Sealed this

Twelfth Day of December, 2006

JON W. DUDAS
*Director of the United States Patent and Trademark Office*